United States Patent
Spencer et al.

(10) Patent No.: US 8,596,600 B2
(45) Date of Patent: Dec. 3, 2013

(54) COLLABORATIVE PANEL SYSTEM

(75) Inventors: Stephen Spencer, Pittsburgh, PA (US);
Joseph Ballay, Pittsburgh, PA (US);
David Bishop, Sewickley, PA (US);
Donald MacDonald, Pittsburgh, PA (US); John Crowley, Pittsburgh, PA (US)

(73) Assignee: Maya Design, Inc., Pittsburgh, PA (US)

( * ) Notice: Subject to any disclaimer, the term of this patent is extended or adjusted under 35 U.S.C. 154(b) by 128 days.

(21) Appl. No.: 12/860,022

(22) Filed: Aug. 20, 2010

(65) Prior Publication Data

US 2011/0042541 A1 Feb. 24, 2011

Related U.S. Application Data

(60) Provisional application No. 61/235,585, filed on Aug. 20, 2009.

(51) Int. Cl.
*A47B 23/04* (2006.01)

(52) U.S. Cl.
USPC .............. 248/447.1; 248/488; 40/611.01

(58) Field of Classification Search
USPC ............. 248/441.1, 447.1, 507, 508, 488;
40/606.01, 606.17, 611.01; 52/506.08,
52/509, 512, 585.1
See application file for complete search history.

(56) References Cited

U.S. PATENT DOCUMENTS

| | | | |
|---|---|---|---|
| 2,711,670 A * | 6/1955 | Clarke | 355/72 |
| 3,905,169 A * | 9/1975 | Gallo | 52/137 |
| 4,638,618 A * | 1/1987 | Iesaka et al. | 52/509 |
| 5,361,164 A | 11/1994 | Steliga | |
| 5,671,852 A * | 9/1997 | Maharg | 211/189 |
| 6,199,328 B1 * | 3/2001 | McGrath et al. | 52/127.1 |
| 6,251,500 B1 | 6/2001 | Varga | |
| 6,272,779 B1 * | 8/2001 | Seiber et al. | 40/607.14 |
| 6,354,227 B1 | 3/2002 | Feldpausch | |
| 6,718,709 B2 * | 4/2004 | Koutras et al. | 52/285.1 |
| 6,931,795 B1 * | 8/2005 | Baloga et al. | 52/36.1 |
| 6,941,691 B2 * | 9/2005 | Arko et al. | 40/611.11 |

(Continued)

FOREIGN PATENT DOCUMENTS

| | | |
|---|---|---|
| JP | 2002-326497 | 11/2002 |
| KR | 20-1995-0023007 | 8/1995 |
| KR | 10-2004-0034628 | 4/2004 |

OTHER PUBLICATIONS

Walltalkers tac-wall® surface, from Walltalkers website, undated, 1 page, seen at http://www.walltalksers.com/products/tac-wall.asp.

(Continued)

*Primary Examiner* — Bradley Duckworth
(74) *Attorney, Agent, or Firm* — GTC Law Group LLP & Affiliates; John A. Monocello, III

(57) ABSTRACT

A modular collaborative panel system intended for use on walls, frames and stands is disclosed. The system uses dry erase boards, chalk or black boards, or other panels having at least one writing surface. The panels have notches or cut-outs on each side so the panels can be mounted to a wall or a frame using pegs. The system combines panels in rows or columns, or both, to form a large, modular system for use at meetings, gatherings or other assemblies. The system allows a large number of users to contribute to a presentation, and also allows users to view the presentation.

24 Claims, 3 Drawing Sheets

(56) References Cited

U.S. PATENT DOCUMENTS

| | | |
|---|---|---|
| 7,325,343 B2 * | 2/2008 | Seiber et al. ............... 40/606.02 |
| 7,399,184 B2 | 7/2008 | Hester |
| 7,866,075 B2 * | 1/2011 | Meeker et al. ............. 40/606.01 |
| 2001/0054674 A1 * | 12/2001 | Turner ....................... 248/441.1 |
| 2002/0124515 A1 * | 9/2002 | Pacione ......................... 52/509 |
| 2005/0145769 A1 * | 7/2005 | Ives et al. ................... 248/447.1 |
| 2005/0166541 A1 | 8/2005 | Federov et al. |
| 2009/0139127 A1 * | 6/2009 | Southard .......................... 40/761 |
| 2010/0236118 A1 * | 9/2010 | Meyers et al. ............. 40/611.01 |
| 2010/0269385 A1 * | 10/2010 | Walter ....................... 40/606.18 |

OTHER PUBLICATIONS

Walltalkers mag-rite® II surface, from Walltalkers website, undated, 1 page, seen at http:/www.walltalkers.com/products/mag-rite-ii.asp.
International Search Report, PCT/US10/46097, Mailed May 5, 2011, 9 pages.

* cited by examiner

COLLABORATIVE PANEL SYSTEM

PRIORITY CLAIM

The present application claims priority from, and the benefit under 35 U.S.C. §119(e) for, U.S. Provisional Application No. 61/235,585, of the same title, filed on Aug. 20, 2009, which is hereby expressly incorporated by reference.

FIELD

The field of the disclosure is modular, portable panels with non-permanent writing surfaces to enable collaboration. More specifically, the field of the invention is for a modular board system capable of being removably mounted on a wall or stand, each individual panel easily handled by one person and the panels stackable upon each other.

BACKGROUND

Gatherings of people, such as meetings, are useful for discussions on many topics. These gatherings are enhanced if there is a semi-permanent, erasable method for writing down ideas, talking points, qualifications, or other data pertinent to the discussion. An example is a high school or college classroom, in which a professor will write down the main points, for example, for the lesson of the day. Other examples include sales meetings, in which salesmen or sales managers may list products and their respective advantages. Still another example is a "poster board" session common at scientific or engineering meetings. These poster board sessions allow presenters to list topics, data or data points, ideas for a next stage of development, and so forth. The media or surfaces used in these meetings may take many forms.

Surfaces that promote collaboration are well known and date back to the chalk board. Surfaces known to promote or facilitate collaboration in the modern setting include white boards, cork boards, or any other surface on to which users can write (preferably in a non-permanent way) or affix objects (also, preferably in a non-permanent way). Conventional systems, however, suffer from disadvantages. One such disadvantage is that most surfaces are not easily movable. Therefore, the fruits of the collaborative effort remain fixed in the place where they materialized. Systems allowing portability are often cumbersome. For example, it has long been the case that black boards and white boards could be wheeled into another location, but moving an unwieldy black board is often a two-person job and may result in the would-be movers determining that it is not worth the effort. Other movable systems exist wherein writing surfaces are removably mounted to a wall by way of a track system. The track system runs the length of the wall, and is thus unsightly and expensive to install. These systems also require structural support which may not be present, for example, in modern offices where walls and dividers tend to be thin and somewhat temporary. In other embodiments, black boards may be stacked vertically and use a complicated pulley-and-rope system to change boards quickly. Such systems require maintenance. Still further, if users are to enjoy the benefits of moving surfaces or panels from the wall of one room to the wall of another room, the other room needs to be equipped with the track.

In larger meetings especially, or in those with a high interest in a particular topic, board space or presentation space may be in short supply compared to the number of participants or hopeful participants. Thus, it is common for meeting sites or gatherings to furnish many such boards. Each unit furnished is typically a single board, such as a dry erase board, a chalk board or even a smart board, which may be computer controlled and capable of "remembering" what is written and even downloading the written images for later print out in a smaller medium, e.g., one or more sheets of paper. Of course, such smart boards are very expensive and may not be affordable for smaller organizations.

The other typical solution, as mentioned, is to furnish many single boards, which may then be formed in a line for longer presentations, or joined to make a straighter line, which may present topics, ideas or data in a desired sequence. One problem with this method is that it may require many boards to convey all the information presented, and the line of single boards may thus be rather long or limited by available wall space. Other solutions include the use of very large paper pads (up to sizes of 24 inches wide by 30 inches high), in which one or more person writes on the top sheet, which is then removed and taped or pasted to a nearby wall for group consideration. In the usual situation, even though the pad typically has a kraft backing, the pad is not sufficiently stiff to enable precise writing. The result can be an agglomeration of unsightly and disjointed papers spread over an entire room.

What is needed is a better way of presenting information, especially information that requires several panels or boards, such as those intended for small or large gatherings. These and other advantages of the disclosure, as well as additional inventive features, will be apparent from the description provided herein.

BRIEF SUMMARY

One embodiment is a modular panel system to foster collaboration in a work setting. The system includes a writing panel having a first edge and a second edge, the writing panel also including a smooth surface adapted for non-permanent writing on at least one side of the writing panel. The writing panel also includes a cutout on each of the first edge and the second edge, a distance between centers of the cutouts substantially equivalent to a width of the writing panel. The system also includes a first peg and a second peg adapted for horizontal placement in a wall or frame behind the writing panel, wherein the first and second pegs are adapted to partially fit within the cutouts to support the writing panel in place.

Another embodiment is a modular panel system to foster collaboration in a work setting. The system includes at least two writing panels, each panel having a first edge and a second edge, the at least two writing panels arranged adjacent to one another in at least one of a row and a column, and a smooth surface adapted for non-permanent writing on at least one side of the each of the writing panels. Each writing panel also includes a cutout on each of the first edge and the second edge of each panel, a distance between centers of the cutouts substantially equivalent to a width of the writing panel. The system is designed so that if the panels are arranged in a row, the system includes three pegs adapted for horizontal placement in a wall or frame behind the writing panel, wherein the pegs are adapted to partially fit within the cutouts to support the writing panels in place in a row, and the system includes an additional peg for each additional panel after the at least two writing panels. If the panels are arranged in a column, the system includes four pegs adapted to partially fit within the cutouts to support the at least two writing panels in place in a column, and the system then includes two additional pegs for each panel after the at least two writing panels.

Yet another embodiment is a method of mounting a modular panel system to foster collaboration. The method includes steps of furnishing at least two writing panels, each panel having a first edge and a second edge, the at least two writing panels arranged adjacent one to another in at least one of a row and a column, wherein each panel comprising a smooth surface adapted for non-permanent writing on at least one side of the each of the two writing panels and wherein each panel further comprises a cutout on each of the first edge and the second edge of each panel, a distance between centers of the cutouts substantially equivalent to a width of the writing panel. The method also includes steps of placing pegs into a wall or frame behind the at least two writing panels, the pegs adapted to fit at least partially into the cutouts to support the at least two writing panels, and supporting the at least two writing panels adjacent each other in place using the cutouts and the pegs.

Other embodiments and advantages will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. The drawings are meant to be illustrative rather than limiting. In the drawings.

While the invention is described in connection with certain embodiments, there is no intent to limit the coverage to those embodiments. The intent is to cover all alternatives, modifications and equivalents as included within the spirit and scope of the invention as described herein and defined by the claims below. All references, including publications, patent applications, and patents cited herein are hereby incorporated by reference to the same extent as if each reference were individually and specifically indicated to be incorporated by reference and were set forth in its entirety herein.

DETAILED DESCRIPTION

Figure 1:
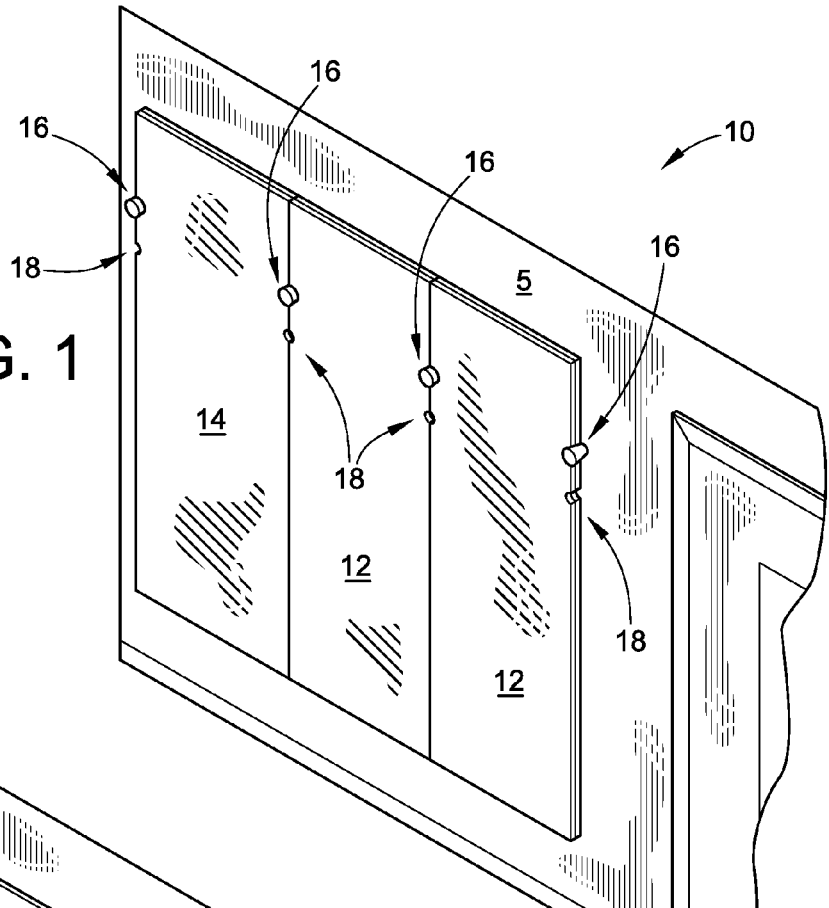
FIG. 1 depicts a perspective view of a first embodiment of a collaborative panel system on a wall.
Figure 3:
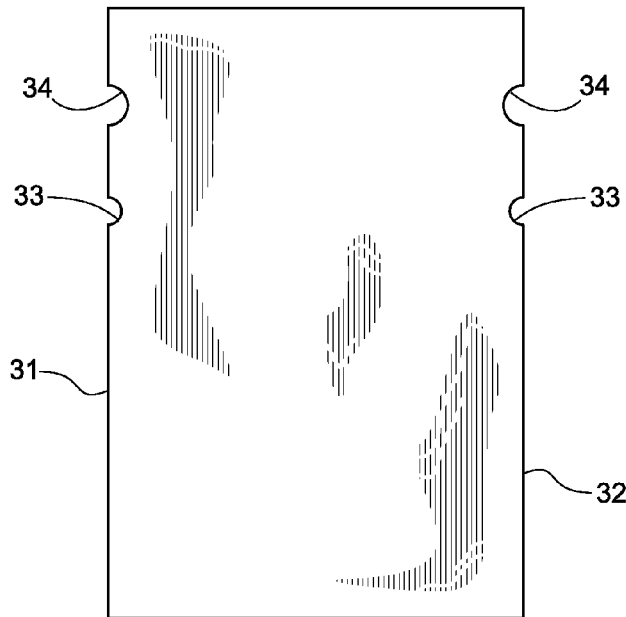
FIG. 3 depicts a front view of a panel according to the present disclosure.

FIG. 1 depicts an embodiment of the invention wherein six lightweight, portable panels are removably mounted to a wall three wide and 2 deep. The panels are stacked and thus FIG. 1 does not readily show the backmost panels. In FIG. 1, a wall 5 provides a mount for a collaborative panel system 10. The panel system 10 includes a top layer of three panels, including two writing surface panels 12 and an attachment surface panel 14 on the left. These panels are described below. The panels are mounted to the wall with small pegs 16 using cutouts (not seen in FIG. 1) on the edges of the panels. The cutouts, more easily seen in FIG. 3, are simply spaces on the edges of the panels that are suitable for holding by the pegs. The panels are also provided with finger pulls 18, which are smaller cutouts that enable users to easily remove individual panels from the pegs. The system depicted in FIG. 1 also includes a second layer of panels beneath the top layer. Users may quickly and easily remove or add panels using the finger pulls, pegs and cutouts provided.

The leftmost panel or attachment board 14 shown in FIG. 1 allows for the attachment of light objects such as posters, pictures, written materials, and the like. In some embodiments, such panels are made of foam-core material such as that manufactured by Alcan Composites USA, Inc. of Benton, Ky. In one embodiment, a rigid foam board may be used as a tack board for pinning papers or objects on both sides. In other embodiments, the attachment board is a cork board, allowing for pinning of papers or objects to the cork surface. Other embodiments include a tack board, a fabric board, a magnetic board and a hook-and-loop (e.g., Velcro®) board. These panels are available from a variety of manufacturers, wholesalers and retailers. These include Acco Brands, Lincolnshire, Ill. and CorkBoards.us.com, Bristol, R.I., and many others.

The middle panel and the rightmost panel in FIG. 1 can also be made of a lightweight foam-core material as described above; however, these panels comprise a writing/projection surface for the application of non-permanent (dry-erase) writing. The writing/projection surface could be on one or both sides of the panel. Panels with one side comprising the writing surface can be considered "combination" panels since the other side is equipped to accept the attachment of materials as described above. Other embodiments with a writing surface include black or chalk boards, green boards, and so forth.

Each panel may be made from one, two or more layers, e.g., a stiff structural layer, covered with a writing surface layer and. In stiff panels, a first such layer can be made of a material such as hardboard, which is commonly known as "Masonite." The stiff layer can also be made of polycarbonate, polyethylene, HDF, high-density polyethylene ("HDPE"), medium density fiberboard (MDF), or the like. The second or writing layer is affixed to the first layer by various conventional means, including by way of an adhesive or lamination process. The second layer can be made of a material or coating which allows for application of non-permanent writing by, for example, dry-erase markers, or for a projection surface. An example of suitable dry erase writing surfaces, projection surfaces, or combination surfaces are those sold under the trademark Walltalker®. Walltalker® is a division of RJF International Corporation of Fairlawn, Ohio. In yet other embodiments, there are three layers, for example, a middle rigid foam board central layer, with an outer writing, projection or attachment surface on either side.

In other embodiments, the panel is a single piece of material that provides both structural integrity and a writing surface. In this embodiment, the panel is made of high-density polyethylene ("HDPE") or other material described above that is used in the first layer, provided such materials facilitate non-permanent writing. In still another embodiment, the panel is a single material that provides both the structural integrity and the writing projection surface wherein the material is what is commonly referred to as showerboard. The skilled artisan will appreciate that there are other materials from which the panel could be made and that this disclosure does not limit embodiments to these materials.

As also shown in FIG. 1, the row of panels is removably mounted to the wall by a simple system of pegs. FIG. 1 shows four pegs 16 that removably support the three panels in the top layer, as well as the additional three panels in a layer beneath.

Figure 2:
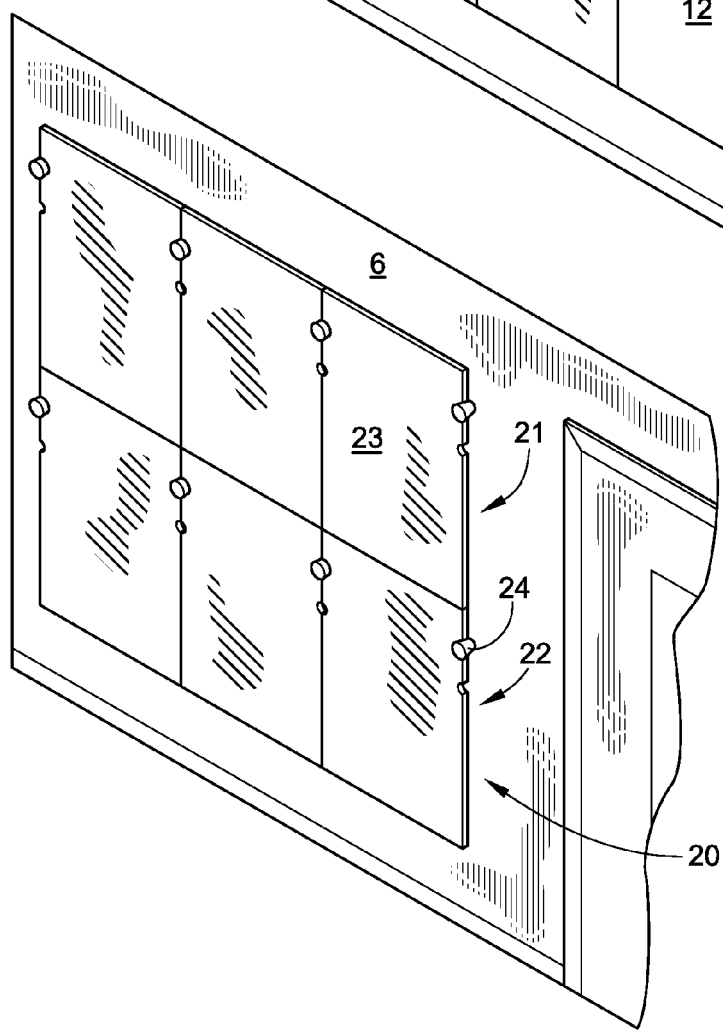
FIG. 2 depicts a perspective view of a second embodiment of a collaborative panel system on a wall.

Another embodiment uses both horizontal rows and vertical columns of panels. FIG. 2 depicts a collaborative panel system 20 mounted on a wall 6. The panel system includes a top row 21 of panels 23 as well as a bottom row 22 of panels. The panels are mounted to the wall with pegs 24. Still other embodiments may use other combinations of rows or columns to arrange the panels.

Note that each row of panels is separately mounted from the other row or rows. Since each panel is supported by two pegs, a row of panels will require a number of pegs equal to the number of panels, and one additional peg. Thus, a single panel requires two pegs, two panels require three pegs, and so forth. In FIG. 2, each row includes three panels and requires four pegs, as shown, to mount the panels. In columns, each panel is separate from the panel below it. Thus, panels in a single column will require two mounting pegs per panel.

FIG. 3 depicts a closer view of a panel used in the collaborative panel systems described herein. Panel 30 includes a left edge 31 and a right edge 32. Each edge is provided with a small finger pull 33 and a larger cutout 34. In this embodiment, the finger pulls and the cutouts are hemispherical. In other embodiments, the cutouts may have different shapes to accommodate pegs of a different shape, but a hemispherical shape is easy to use and easy to provide during the manufacturing process. Hemispherical cutouts are intended for use with pegs having a circular cross section, e.g., pegs that are cylindrical, conical, or frusto-conical (a truncated conical shape).

Figure 4:
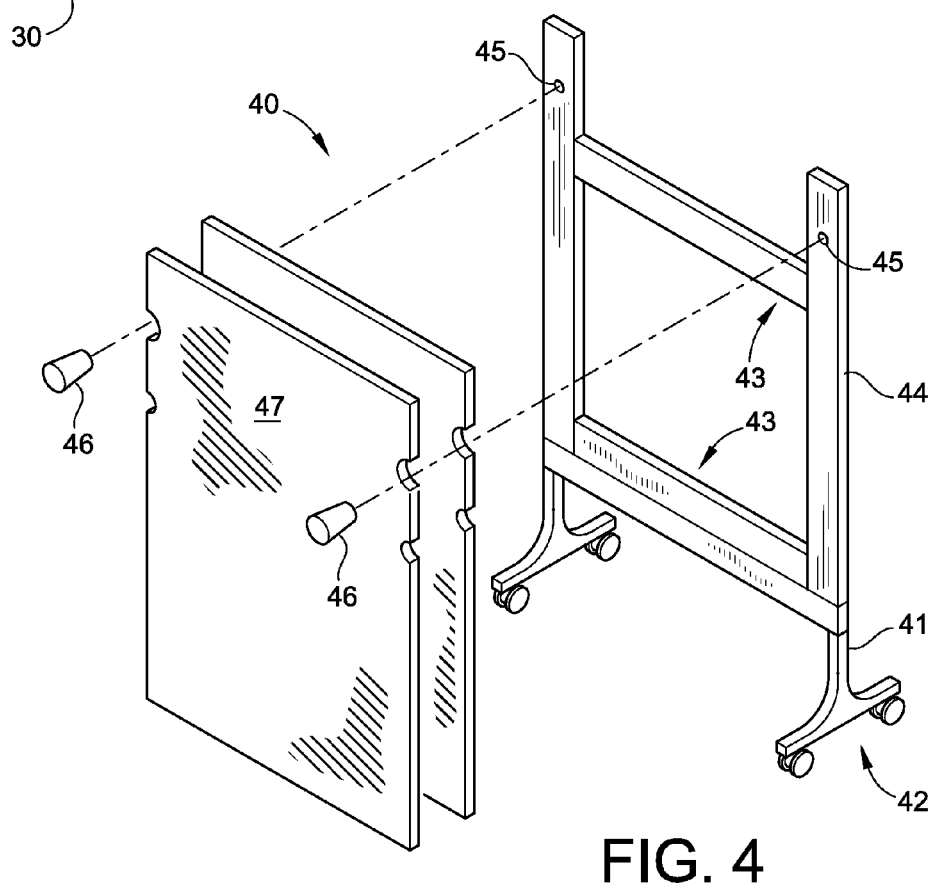
FIG. 4 depicts an exploded view of a third embodiment of a collaborative panel system on a frame or stand.

FIG. 4 depicts an embodiment in which a moveable stand is used in place of a wall in a portable version of a collaborative panel system 40. The moveable stand 41 is equipped with legs and wheels 42, cross braces 43, posts 44 and orifices 45 for accommodating pegs 46. Panels 47 are writing panels or attachment panels, as discussed above. The embodiment in FIG. 4 uses a single panel, two panels deep, while other embodiments are designed for two or more panels, in a column or in a row, or both. Of course, more than one stand 41 may be used to enlarge the number of panels available for display at a given time.

Figure 5:
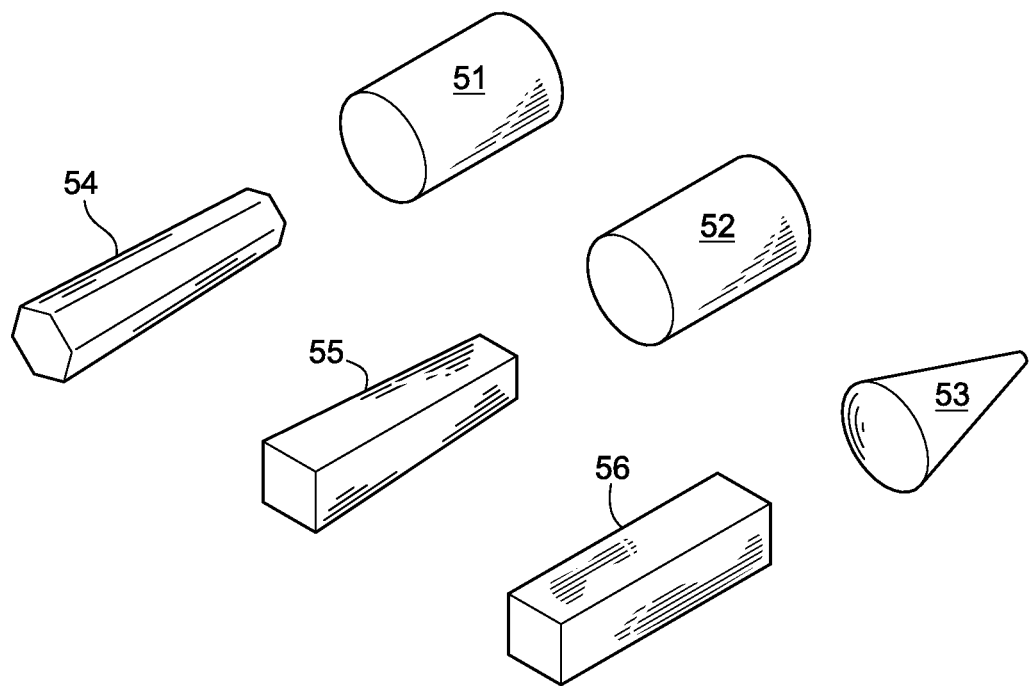
FIG. 5 depicts embodiments of pegs according to the present disclosure.

As noted above, the pegs may have a circular cross section. In other embodiments, the pegs have other shapes. FIG. 5 discloses several embodiments of pegs, all of which should be long enough to firmly embed in the wall or stand provided, and provide secure support for the light-weight panels intended for their use. Embodiments depicted include elliptical 51, cylindrical 52, conical 53, a hexagonal cylinder 54, pyramidal 55, and an elongated square 56. Other embodiments, such as a truncated cone, are also envisioned. The pegs may be made from any convenient material, such as by being molded or extruded rubber or plastic.

Figure 6:
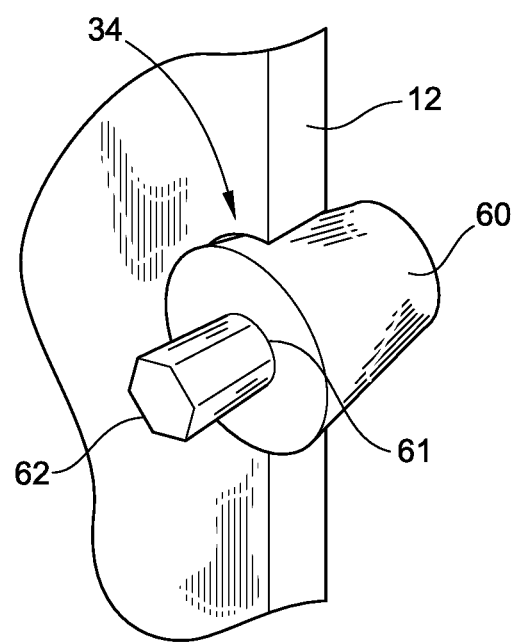
FIG. 6 depicts an alternative embodiment of a peg.

FIG. 6 shows another embodiment of the invention wherein a peg 60 is provided with an aperture 61, a hollowed-out portion, in which a writing instrument 62 is stored. Peg 60 supports the right side of panel 12 with cutout 34. FIG. 6 provides a sufficiently close view of the peg that one can readily see that the center of peg 60 is coincident with the center of cutout 34 on the panel supported by the peg.

By having light-weight panels, an aesthetically simple mounting system, and the option for a variety of surfaces, embodiments provide a collaborative wall system that is easy to use, movable by one person, requires little maintenance, and has a mounting mechanism that does not require large areas of wall space (such as a track on a wall). Thus, the fruits of collaborative efforts can be moved, re-oriented, stacked, or otherwise configured to achieve flexibility in a collaborative setting. By way of example, collaborative settings can include office, education, the home, or the like.

In the embodiments disclosed, the cutouts on the panels are depicted in the upper half of the panel, that is, above the center of gravity of the panel. This is done for purposes of balance as well as ease of use by the person or persons manipulating the panels. The cutouts could be placed below the center of gravity, but the panel would then be somewhat top-heavy, and relatively unstable. For example, if such a panel is used in a portable stand and the stand is tipped somewhat when it is moved, the panel may be tipped from its resting place. The better practice is to place the cutouts near the vertical top of the board.

In the embodiments disclosed, the panels are depicted with a long side oriented vertically in its mounting ("portrait" orientation). Other embodiments may use panels with the long side oriented horizontally ("landscape" orientation). Of course, panels with other shapes or orientations may be used. It is also the intent of this disclosure that the panels described and used are lightweight and portable. Each board can readily be moved from location to location, whether on a single wall, to a mounting place on an opposite wall, or to a room on another floor of the building. The panels are inexpensive, lightweight, portable and convenient to use, thus fostering collaboration and encouraging teamwork.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

While embodiments of the invention have been disclosed and described in detail, it is understood that various modifications and improvements thereon will become readily apparent to those skilled in the art. Accordingly, the spirit and scope of the present disclosure is not limited by the foregoing examples, but is better understood by the claims below.

What is claimed is:

1. A modular panel system to foster collaboration in a work setting, the system comprising:
   a writing panel having a first vertical edge and a second vertical edge;
   a smooth surface adapted for non-permanent writing on at least one side of the writing panel;
   a cutout on each of the first vertical edge and the second vertical edge, a distance between centers of the cutouts substantially equivalent to a horizontal dimension of the writing panel; and
   a first peg and a second peg adapted for horizontal placement in a wall or frame behind the writing panel, wherein the cutouts at least partially fit over the first and second pegs to solely support the writing panel in place and wherein the panels are removable without removing the pegs.

2. The system according to claim 1, wherein the system comprises a plurality of writing panels arranged adjacent to one another in a column, and further comprising two additional pegs for each additional writing panel.

3. The system according to claim 1, wherein the pegs are cylindrical, truncated cylindrical or conical, and wherein a radius of the cutouts substantially equals a radius of the pegs.

4. The system according to claim 1, wherein the pegs have a substantially geometric shape, and wherein a radius of the cutouts substantially equals about half a distance across a width of the pegs.

5. A modular panel system to foster collaboration in a work setting, the system comprising:
   at least two writing panels, each panel having a first vertical edge and a second vertical edge, the at least two writing panels arranged adjacent to one another in at least one of a row and a column;
   a smooth surface adapted for non-permanent writing on at least one side of the each of the writing panels; and
   a cutout on each of the first vertical edge and the second vertical edge of each panel, a distance between centers of the cutouts substantially equivalent to a horizontal dimension of the writing panel,
   wherein if the panels are arranged in a row, further comprising three pegs adapted for horizontal placement in a wall or frame behind the writing panel, wherein the cutouts at least partially fit over the pegs to solely support the writing panels in place in a row, and further comprising an additional peg for each additional panel after the at least two writing panels; and
   wherein if the panels are arranged in a column, further comprising four pegs, wherein the cutouts at least partially fit over the pegs to solely support the at least two writing panels in place in a column, and further comprising two additional pegs for each panel after the at least two writing panels; and
   wherein the panels are removable without removing the pegs.

6. The system according to claim 5, further comprising a frame for mounting the at least two writing panels, the frame comprising mounts for the pegs.

7. The system according to claim 5, further comprising a finger pull on each of the first edge and the second edge of each panel.

8. The system according to claim 5 wherein at least one of the writing panels has smooth surfaces for writing on a front side and on a back side of the at least one panel.

9. The system according to claim 5, wherein each smooth surface comprises a surface selected from the group consisting of a dry erase surface, a chalk board, and a plastic surface.

10. The system according to claim 5, wherein at least one writing panel has an attachment surface selected from the group consisting of a cork board, a tack board, a magnetic surface and a hook-and-loop attachment board.

11. The system according to claim 5, wherein at least one of the pegs has an aperture suitable for storing a writing instrument.

12. A method of mounting a modular panel system to foster collaboration, the method comprising:
   furnishing at least two writing panels, each panel having a first vertical edge and a second vertical edge, the at least two writing panels arranged adjacent one to another in at least one of a row and a column, wherein each panel comprises a smooth surface adapted for non-permanent writing on at least one side of the each of the two writing panels and wherein each panel further comprises a cutout on each of the first vertical edge and the second vertical edge of each panel, a distance between centers of the cutouts substantially equivalent to a horizontal dimension of the writing panel;
   placing pegs into a wall or frame behind the at least two writing panels, the cutouts adapted to fit at least partially over the pegs to solely support the at least two writing panels; and
   supporting the at least two writing panels adjacent each other in place using the cutouts and the pegs, wherein the at least two writing panels are removable without removing the pegs.

13. The method according to claim 12, wherein the pegs have a substantially geometric shape, and wherein a radius of the cutouts substantially equals about half a distance across a width of the pegs.

14. The method according to claim 12, further comprising writing on the writing panels.

15. The method according to claim 12, further comprising furnishing an attachment panel and supporting the attachment panel adjacent at least one of the at least two writing panels using cutouts on the attachment panel and pegs.

16. The method according to claim 12, further comprising storing a writing instrument in a space within at least one of the pegs.

17. A modular panel system to foster collaboration in a work setting, the system comprising:
   a writing panel having a first vertical edge and a second vertical edge;
   a smooth surface adapted for non-permanent writing on at least one side of the writing panel;
   a cutout on each of the first vertical edge and the second vertical edge, each cutout having a shape; and
   a first peg and a second peg each adapted for horizontal placement in a wall or frame behind the writing panel, each peg having substantially the same shape as the shape of the cutouts, wherein the cutouts fit at least partially over the pegs, and
   wherein contact between the cutouts and the pegs solely support the panel in a vertical position and wherein the panel is removable without removing the pegs.

18. A modular panel system to foster collaboration in a work setting, the system comprising:
   a writing panel having a first vertical edge and a second vertical edge;
   a smooth surface adapted for non-permanent writing on at least one side of the writing panel;
   a cutout on each of the first vertical edge and the second vertical edge, a distance between centers of the cutouts substantially equivalent to a horizontal dimension of the writing panel; and
   a first peg and a second peg adapted for horizontal placement in a wall or frame behind the writing panel, wherein the first and second pegs are adapted to partially fit within the cutouts to solely support the writing panel in place,
   wherein the panel can be removed from engagement with the pegs without the need of removing the pegs from the wall or frame.

19. The modular panel system of claim 17, wherein the shapes of the pegs are at least one of cylindrical and conical.

20. The modular panel system of claim 17, wherein the cross-sectional shapes of the pegs is that of a polygon.

21. The system according to any one of claims 1, 17 and 18 wherein the system comprises a plurality of writing panels arranged adjacent to one another in a row, each of the writing panels comprising a first vertical edge and a second vertical edge, and a cutout on each of the first vertical edge and the second vertical edge, and further comprising an additional peg for each additional writing panel, and wherein each additional peg supports the additional writing panel using the cutouts in the panels.

22. The system according to any one of claims 1, 17 and 18, wherein the cutouts are placed above a center of gravity of the panel.

23. The system according to any one of claims 1, 17 and 18, further comprising at least one additional panel for stacking atop the writing panel, wherein the pegs are sufficiently long to support at least two panels.

24. The system according to any one of claims 1, 17 and 18, wherein the writing panel further comprises a surface adapted to accept light objects.

\* \* \* \* \*

UNITED STATES PATENT AND TRADEMARK OFFICE
CERTIFICATE OF CORRECTION

PATENT NO. : 8,596,600 B2  
APPLICATION NO. : 12/860022  
DATED : December 3, 2013  
INVENTOR(S) : Stephen Spencer et al.

It is certified that error appears in the above-identified patent and that said Letters Patent is hereby corrected as shown below:

In the Claims

In column 7, line 27, in claim 5, delete "the panels" and insert -- the at least two panels --, therefor.

In column 7, line 29, in claim 5, delete "the writing" and insert -- the at least two writing --, therefor.

In column 7, line 29, in claim 5, delete "panel," and insert -- panels, --, therefor.

In column 7, line 31, in claim 5, delete "the writing" and insert -- the at least two writing --, therefor.

In column 7, line 33, in claim 5, delete "panels; and" and insert -- panels; --, therefor.

In column 7, line 40, in claim 5, delete "the panels" and insert -- the at least two panels --, therefor.

Signed and Sealed this  
Eighth Day of April, 2014

Michelle K. Lee  
*Deputy Director of the United States Patent and Trademark Office*